United States Patent
Yu et al.

(10) Patent No.: US 12,314,609 B1
(45) Date of Patent: May 27, 2025

(54) GLOBAL MEMORY SLOT SIZE BASED DESTAGE PRIORITIZATION

(71) Applicant: Dell Products, L.P., Hopkinton, MA (US)

(72) Inventors: Rong Yu, West Roxbury, MA (US); Lixin Pang, Needham, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/592,644

(22) Filed: Mar. 1, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 10,496,278 B1* | 12/2019 | O'Hare | ............... | G06F 3/0604 |
| 11,526,447 B1* | 12/2022 | Wu | ............... | G06F 3/0665 |
| 2017/0242587 A1* | 8/2017 | Blaum | ............... | G06F 3/0656 |
| 2021/0365379 A1* | 11/2021 | Creed | ............... | G06F 9/505 |
| 2022/0229589 A1* | 7/2022 | Pang | ............... | G06F 3/0689 |

* cited by examiner

*Primary Examiner* — Arpan P. Savla
*Assistant Examiner* — Edmund H Kwong
(74) *Attorney, Agent, or Firm* — Anderson Gorecki LLP

(57) ABSTRACT

As front-end write IO operations occur, the front-end write IO operations are allocated slots of global memory and mapped to slices of back-end tracks. A back-end write destage manager allocates back-end slices to aging buckets based on the number of write operations pending destage for the given back-end slice. As global memory destage pressure increases, the back-end write destage manager uses a weighted bucket table to increase the weight back-end slices with larger numbers of front-end tracks that are occupying the larger slots of global memory. This results in back-end slices that are owed data from front-end tracks occupying larger front-end slot sizes to be placed in aging buckets with shorter aging times. These back-end slices are thus more quickly selected to be destaged, thus causing a larger percentage global memory slots of the largest slot size to be made available to be allocated to subsequent host IO write operations.

20 Claims, 9 Drawing Sheets

GLOBAL MEMORY SLOT SIZE BASED DESTAGE PRIORITIZATION

FIELD

This disclosure relates to computing systems and related devices and methods, and, more particularly, to a method and apparatus for prioritizing back-end destage prioritization based on front-end global memory slot size allocation.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for prioritizing write destage operations to back-end storage resources based on a weighted aging algorithm that incorporates both global memory destage pressure and front-end track slot size allocations is provided. In some embodiments, as front-end write IO operations occur, the front-end write IO operations are allocated slots of global memory and mapped to slices of back-end tracks. A back-end write destage manager allocates back-end slices to aging buckets based on the number of write operations pending destage for the given slice. As the global memory destage pressure increases, the back-end write destage manager uses a weighted bucket table to weight slices with larger numbers of front-end tracks that are occupying the larger front-end slot sizes. This results in back-end slices that are owed data from front-end tracks occupying larger front-end slot sizes to be placed in aging buckets with shorter aging times. Placing these slices into the higher aging buckets enables the slices to be selected to be destaged with less aging time, thus preferentially making larger numbers of front-end slots of global memory that have the largest slot size available for reuse with subsequent host IO write operations.

In some embodiments, a method of prioritizing back-end slice destage operations based on allocated slot sizes of shared global memory, includes allocating slots of shared global memory to front-end write IO operations, the allocated slots of shared global memory having slot sizes selected from at least two available slot sizes, organizing back-end storage resources in a (Redundant Array of Inexpensive Disks) RAID configuration in which sets of back-end tracks form slices of the RAID configuration, and maintaining a respective mask for each slice of back-end tracks, the respective mask identifying back-end tracks of the slice that are owed data from the front-end write IO operations that have been allocated slots of the shared global memory. The method further includes weighting the mask bits of the respective masks according to a combination of the slot size of shared global memory associated with the corresponding front-end write IO operation that is pending destage to the back-end track and a current destage pressure on shared global memory, using a sum of the weighted mask bits to determine a respective aging time for the slice, and upon expiration of the respective aging time for the slice, selecting the respective slice to be destaged to back-end storage resources.

In some embodiments, using the sum of the weighted mask bits to determine a respective aging time for the slice includes selecting an aging bucket for the slice from a plurality of aging buckets, each aging bucket having a respective unique aging time.

In some embodiments, each aging bucket is configured to contain slices having ranges of values of sums of weighted mask bits, and wherein one of the aging buckets associated with a range of higher values of sums of weighted mask bits has a shorting aging time than one of the aging buckets associated with a range of lower values of sums of weighted mask bits.

In some embodiments, weighting the mask bits of the respective masks according to the combination of the slot size of shared global memory associated with the corresponding front-end write IO operation that is pending destage to the back-end track and the current destage pressure on shared global memory includes determining the current destage pressure and, for each respective set mask bit; determining the slot size of the slot of global memory that was allocated to the front-end write IO operation that has data that is owed to the back-end track associated with the respective set mask bit, and selecting a weight value to be added to the sum of weighted mask bits for the respective set mask bit from a plurality of weight values contained in a weighted bucket table.

In some embodiments, the weighted bucket table contains different weight values for each of a plurality of ranges of current destage pressures. In some embodiments, the weighted bucket table contains larger weight values for front-end write IO operations that were allocated larger slot sizes of shared global memory. In some embodiments, the current destage pressure is calculated as a percentage of the slots of a mirrored policy region of shared global memory that are currently pending destage to back-end storage resources.

In some embodiments, the method further includes adjusting the weight values of the weighted bucket table over time. In some embodiments, adjusting the weight values of the weighted bucket table over time includes training a neural network learning process to learn the weight values to optimize a reduction in destage pressure given as input a current destage pressure, mask values for slices of back-end tracks, and respective slot sizes of front-end tracks.

In some embodiments, the method further includes recalculating the sum of weighted mask bits in response to a determination that the current destage pressure has increased beyond a destage pressure threshold.

In some embodiments, a system for prioritizing back-end slice destage operations based on allocated slot sizes of shared global memory, includes one or more processors and one or more storage devices storing instructions that are configured, when executed by the one or more processors, to cause the one or more processors to perform operations including allocating slots of shared global memory to front-end write IO operations, the allocated slots of shared global memory having slot sizes selected from at least two available slot sizes, organizing back-end storage resources in a (Redundant Array of Inexpensive Disks) RAID configuration in which sets of back-end tracks form slices of the RAID configuration, and maintaining a respective mask for each slice of back-end tracks, the respective mask identifying back-end tracks of the slice that are owed data from the front-end write IO operations that have been allocated slots of the shared global memory. The operations further include weighting the mask bits of the respective masks according to a combination of the slot size of shared global memory associated with the corresponding front-end write IO operation that is pending destage to the back-end track and a current destage pressure on shared global memory, using a sum of the weighted mask bits to determine a respective aging time for the slice, and upon expiration of the respective aging time for the slice, selecting the respective slice to be destaged to back-end storage resources.

In some embodiments, using the sum of the weighted mask bits to determine a respective aging time for the slice include selecting an aging bucket for the slice from a plurality of aging buckets, each aging bucket having a respective unique aging time.

In some embodiments, each aging bucket is configured to contain slices having ranges of values of sums of weighted mask bits, and wherein one of the aging buckets associated with a range of higher values of sums of weighted mask bits has a shorting aging time than one of the aging buckets associated with a range of lower values of sums of weighted mask bits.

In some embodiments, weighting the mask bits of the respective masks according to the combination of the slot size of shared global memory associated with the corresponding front-end write IO operation that is pending destage to the back-end track and the current destage pressure on shared global memory includes determining the current destage pressure and, for each respective set mask bit, determining the slot size of the slot of global memory that was allocated to the front-end write IO operation that has data that is owed to the back-end track associated with the respective set mask bit, and selecting a weight value to be added to the sum of weighted mask bits for the respective set mask bit from a plurality of weight values contained in a weighted bucket table.

In some embodiments, the weighted bucket table contains different weight values for each of a plurality of ranges of current destage pressures. In some embodiments, the weighted bucket table contains larger weight values for front-end write IO operations that were allocated larger slot sizes of shared global memory. In some embodiments, the current destage pressure is calculated as a percentage of the slots of a mirrored policy region of shared global memory that are currently pending destage to back-end storage resources.

In some embodiments, the operations further include adjusting the weight values of the weighted bucket table over time. In some embodiments, adjusting the weight values of the weighted bucket table over time includes training a neural network learning process to learn the weight values to optimize a reduction in destage pressure given as input a current destage pressure, mask values for slices of back-end tracks, and respective slot sizes of front-end tracks.

In some embodiments, the operations further include recalculating the sum of weighted mask bits in response to a determination that the current destage pressure has increased beyond a destage pressure threshold.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
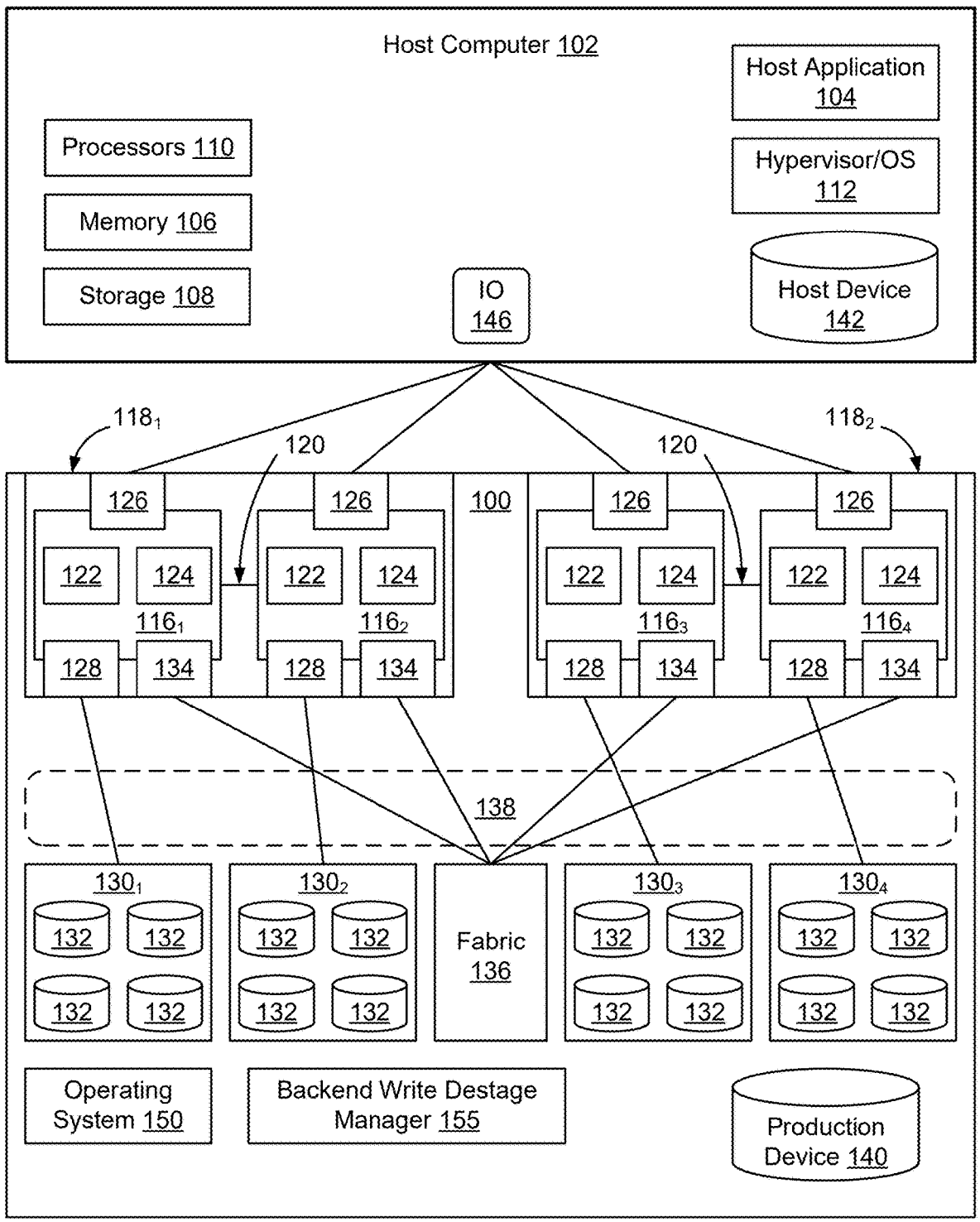
FIG. 1 is a functional block diagram of a host computer connected to an example storage system having a back-end write destage manager configured to prioritize write destage operations to back-end storage resources based on a weighted aging algorithm that incorporates both global memory destage pressure and front-end track slot size allocations, according to some embodiments.

FIG. 1 is a functional block diagram of a host computer connected to an example storage system having DIF enabled compression hardware, according to some embodiments. FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes 116₁-116₄.

In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132. In some embodiments, as shown in FIG. 1, the storage system includes a back-end write destage manager 155 that coordinates destaging data from shared global memory 138 to back-end storage resources 132. In some embodiments, as described in greater detail herein, the back-end write destage manager 155 is configured to prioritize write destage operations to back-end storage resources based on a weighted aging algorithm that incorporates both global memory destage pressure and front-end track slot size allocations.

Figure 2:
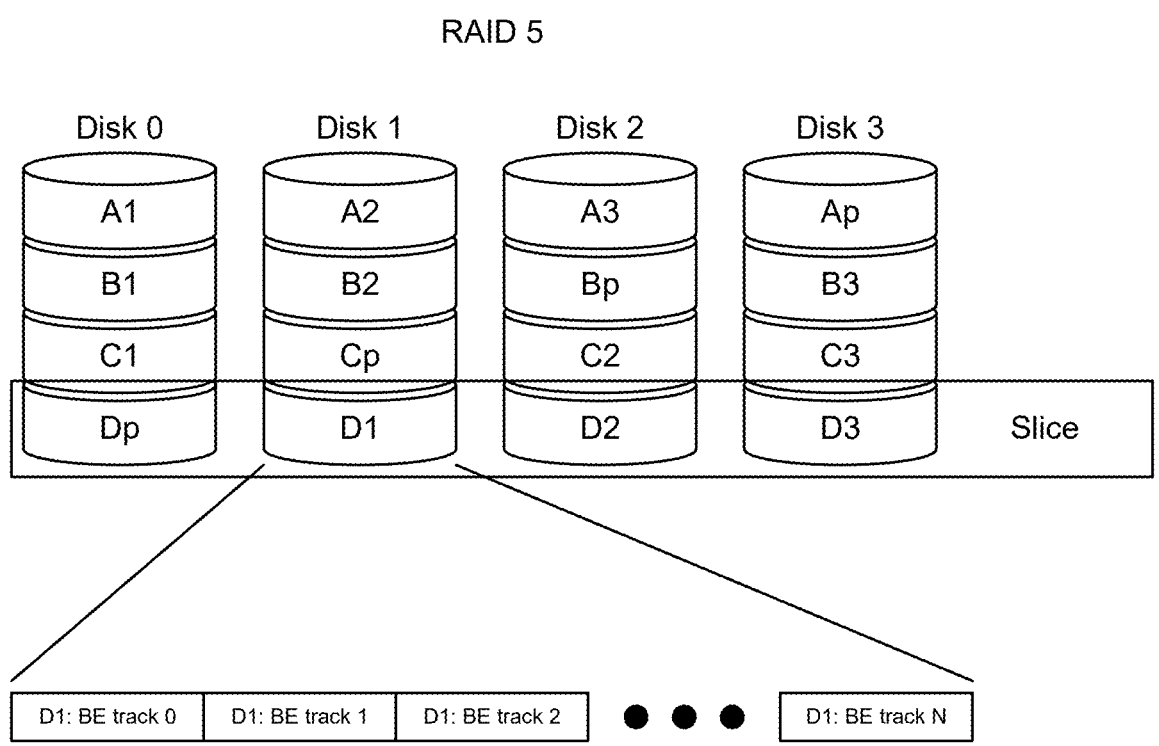
FIG. 2 is a block diagram of an example Redundant Array of Independent Disks (RAID) configuration, according to some embodiments.

Back-End (BE) storage resources such as managed drives 132 can be organized to prevent data loss in the event of failure of one or more of the managed drives 132. One way to organize the managed drives 132 is to organize the managed drives using RAID configurations. FIG. 2 is a block diagram of an example Redundant Array of Independent Disks (RAID) configuration, according to some embodiments. There are many RAID configurations, which use the techniques of striping, mirroring, or parity, to create large reliable data stores from multiple general-purpose computer hard disk drives. Although FIG. 2 shows an example RAID 5 configuration, in which Parity (Ap, Bp, Cp, Dp) is distributed throughout the RAID configuration in each stripe, it should be understood that there are other RAID configurations as well and that the invention is not limited to use with the particular RAID configuration shown in FIG. 2. Rather, FIG. 2 shows an example RAID configuration to help illustrate some environments in which the techniques described herein may be applicable.

As shown in FIG. 2, in some embodiments a given RAID configuration will have multiple stripes, each of which is referred to herein as a "slice". When write IO operations are received at the storage system that are to be stored in back-end storage resources that are organized using a particular RAID configuration, the write IO operations may be immediately destaged to the back-end storage resources or, alternatively, may be held for a period of time in shared global memory 138 prior to being destaged to back-end storage resources 132. For efficiency, it is sometimes advantageous to hold the writes on a given slice in front-end storage resources for a period of time and then destage all write operations on a given slice as a group to the back-end storage resources. This can result in certain back-end efficiencies, as well as potentially resulting in a read IO hit or write IO hit on the front-end, which may occur where the host reads data that has just been written (prior to being destaged) or writes additional data to the same location two or more times before the data is able to be destaged to the back-end storage resources.

As used herein, the term "destaged" is used to refer to a process of moving data from global memory 138 to back-end storage resources 132. As noted above, when a write IO is received from a host, a slot of global memory 138 will be allocated to receive the data associated with the write IO. After the data is stored in the slot of global memory 138, the data will be "destaged" to back-end storage resources 132. As shown in FIG. 2, a given allocation of storage on a given disk of a RAID slice may include a portion of each of a plurality disks, with each disk portion including a plurality of tracks. In FIG. 2, the tracks of disc 1 that are used on that disk to implement a particular RAID slice are shown, it should be understood that each of disks 0, 2 and 3 similarly include allocations of tracks to implement their respective portion of the RAID slice.

In some embodiments, the storage system implements an aging process in which write data is maintained in the FE tracks for an amount of time such that the data will be available to the host if subsequently requested. Write hits and read hits (request for data that is currently in shared global memory) can improve the overall responsiveness of the storage system because it is not necessary to first retrieve the data from back-end storage resources. Additionally, by writing data out of shared global memory to slices of back-end tracks, it is possible to optimize use of the back-end processes.

Figure 3:
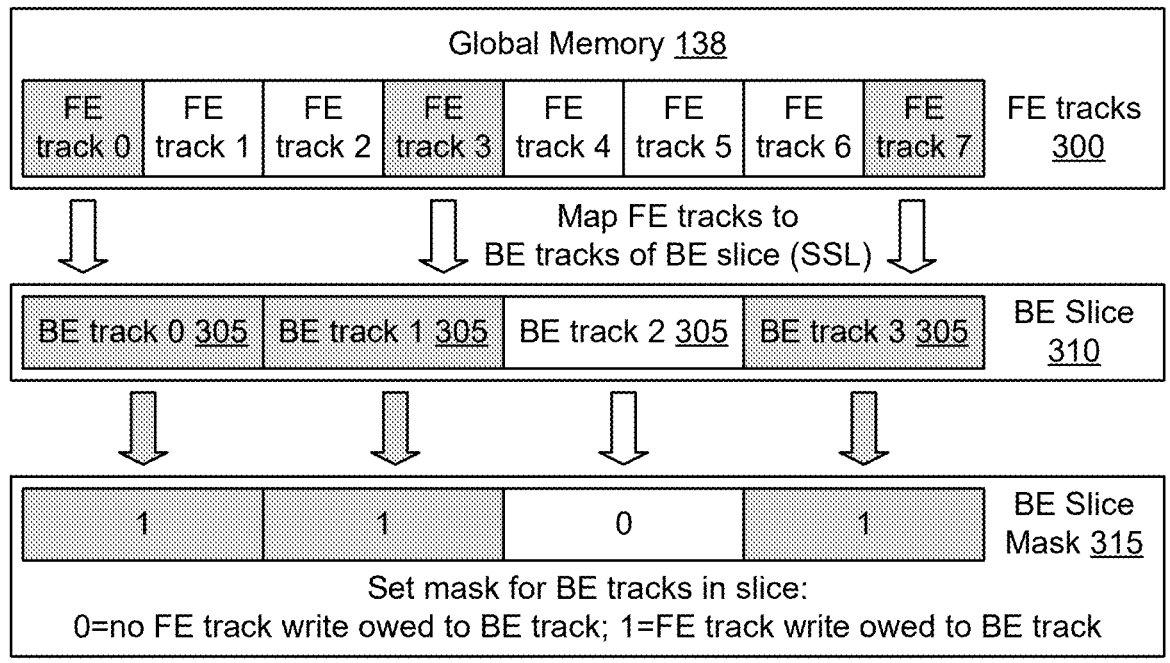
FIG. 3 is a block diagram showing an example mapping between front-end tracks and back-end tracks of a storage system, according to some embodiments.

FIG. 3 is a block diagram showing an example mapping between front-end tracks 300 and back-end tracks 305 of a storage system, according to some embodiments. As shown in FIG. 3, in some embodiments storage systems are configured such that there is not a one-to-one correspondence between front-end tracks 300 and back-end tracks 305. Specifically, in some embodiments when a write IO is received from a host, the slot of global memory 138 that is allocated to store the data associated with the write IO is selected from one of a plurality of sizes. Example sizes might be, for example, 16 Kb, 64 Kb, and 128 Kb, although other slot sizes might be used as well depending on the particular implementation. Back-end tracks, by contrast, might all be provisioned to have the same track size, such as 128 KB, although other BE track sizes might be used depending on the implementation.

As shown in FIG. 3, in some embodiments the storage system back-end processes such as back-end write destage manager 155, which manage back-end storage resources 132, are responsible for destaging data from the front-end tracks to the back-end tracks. In FIG. 3, the front-end tracks are labeled FE track 0 to FE track 7, and the back-end tracks are labeled BE track 0 to BE track 3. It should be understood that there may be multiple front-end tracks and multiple back-end tracks, and that the particular selection of tracks in FIG. 3 is shown merely for purposes of illustration.

To enable the BE processes to manage destage operations, in some embodiments the storage system is designed to enable the BE processes to keep track of which back-end tracks are owed data by the front-end tracks. For example, in some embodiments the BE processes maintain a mask 315 for each slice of BE tracks. An example mask might be implemented, for example as a bit mask, in which each BE track is represented by a single bit in the BE mask. Any time a write occurs on a front-end track 300 that contains data that will need to be written to a back-end track 305, the corresponding bit is set in the BE mask 315 for the BE track.

For example, in FIG. 3 it is assumed that three separate host write IOs have occurred on FE track 0, FE track 3, and FE track 7 (shown using grey boxes in FIG. 3). Data for FE track 0 will be destaged to BE track 0. Accordingly, the bit in the BE mask for BE track 0 has been set to the value 1 in FIG. 3. Likewise, FE track 3 will be destaged to BE track 1 and, accordingly, the bit in the BE mask for BE track 1 has been set to the value of 1. FE track 7, when destaged will be stored in BE track 3 and hence the bit in the BE mask 315 for BE track 3 has been set.

Figure 4:
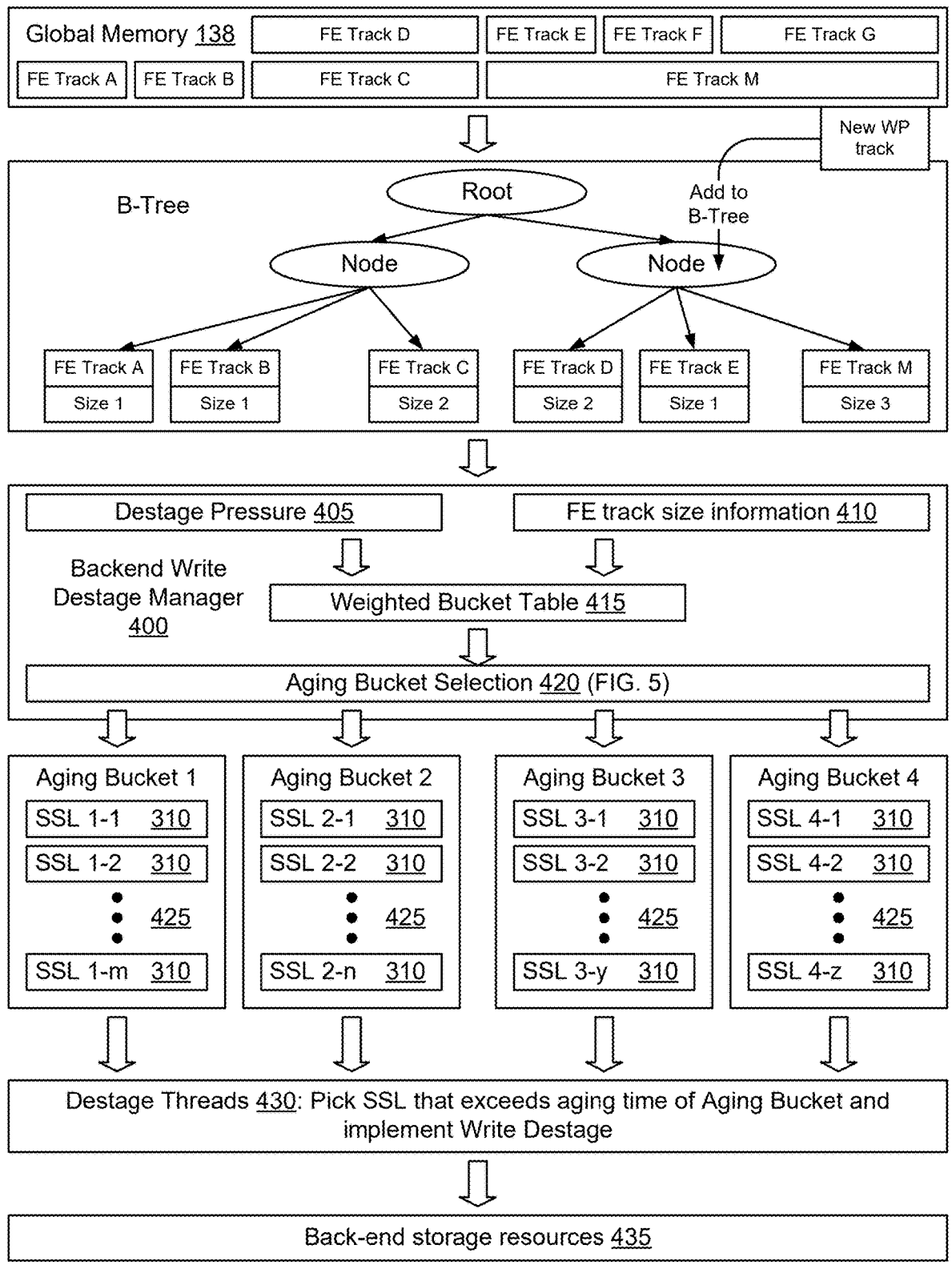
FIG. 4 is a block diagram of several components of an example storage system involved with managing back-end write destage operations, including a back-end write destage manager configured to prioritize write destage operations to back-end storage resources based on a weighted aging algorithm that incorporates both global memory destage pressure and front-end track slot size allocations, according to some embodiments.

In some embodiments, as shown in FIG. 4, write IO operations are organized using one or more B-trees which enable the back-end write destage manager to keep track of which front-end tracks and which back-end tracks are pending destage. Although FIG. 4 shows a single B-tree, it should be understood that some embodiments might maintain multiple B-trees, such as one for the front-end tracks, one for the back-end tracks, one B-tree that maintains a list of SSL elements, etc. Likewise, other data structures may be utilized to keep track of these aspects, depending on the implementation.

As shown in FIG. 4, in some embodiments the back-end write destage manager is configured to allocate back-end slices 310 (BE-SSLs) into aging buckets 425 according to the number of bits that are set for the back-end slice in the bit mask 315. In some embodiments, each bucket is associated with a range of bit mask values and contains a list of back-end slices 310 that are to be stored for a given amount of time (aging time) prior to being destaged. Different buckets have different aging times, such that slices in different buckets will be held for different amounts of time before being destaged to back-end storage resources. In the example shown in FIG. 4 there are four aging buckets. Bucket 1 might have an aging time of 30 seconds, bucket 2 might have an aging time of 10 seconds, bucket 3 might have an aging time of 5 seconds, bucket 4 might have an aging time of 0.1 seconds. Slices with a lower number of write pending tracks, as reflected by the total number of bits set in the slice bit mask are put in a lower level bucket with a longer aging time, while slices with higher numbers of write pending tracks (larger number of bits set in their respective bit mask) are put in higher level buckets with shorter aging times. As the number of back-end tracks that are write pending destage increases, a given slice will be moved from a lower-level bucket (e.g. aging bucket #1) to a higher-level bucket (e.g. aging bucket #2) to move the slice more quickly through the destage process. For example, when a write occurs on a front-end track, the corresponding back-end slice is determined and the back-end slice is added to one of the aging buckets. As additional front-end track writes occur on the slice, the slice may be moved to a higher bucket with a shorter aging time. Each slice has a timestamp identifying when the first front-end track write occurred that was mapped to a track of the back-end slice. When the slice ages out of the bucket, such that the current time minus the timestamp is equal to or greater than the aging time of the bucket, the slice is selected to be destaged.

In some embodiments, different sized slots of global memory may be allocated to front-end write IO operations. For example, assume that there are three slot sizes of global memory (e.g., 16K, 64K, and 128K) that may be allocated to a given write IO. If a write IO is received that has a size of 32K, it is possible to implement that write IO using either a 64K slot or a 128K slot. Likewise, if a 10K write IO is received, it is possible to implement the write IO using any of the three slot sizes. Thus, the 16K slot sizes are only able to be used to implement write IOs smaller than or equal to 16K whereas slots having a size of 128K are able to be used to implement any host write IO. In situations where the host is writing data to global memory faster than the data can be destaged, it would be advantageous to preferentially free up slots having 128K slots size, because those slots are able to be used to implement any host IO.

FIG. 4 is a block diagram of several components of an example storage system involved with managing back-end write destage operations, including a back-end write destage manager configured to prioritize write destage operations to back-end storage resources based on a weighted aging algorithm that incorporates both global memory destage pressure and front-end track slot size allocations, according to some embodiments. As shown in FIG. 4, in some embodiments the back-end write destage manager 400 receives an indication of the global memory destage pressure 405 and front-end slot size information 410 for each front-end track that is mapped to a back-end slice, and uses a weighted bucket table 415 to implement the aging bucket selection 420.

In some embodiments, global memory is divided into two memory policy regions—an unmirrored memory policy region that is used to implement host read IO operations, and a mirrored memory policy region that is used to implement host write IO operations. When a host read IO miss occurs, the data requested by the host resides in back-end storage resources. Accordingly, an unmirrored slot of global memory 138 may be allocated to the host read IO operation. The unmirrored policy region is therefore used to implement host read IO operations. By contrast, when a host write IO occurs, the host is providing new data to the storage system. Accordingly, a mirrored slot (two slots) of global memory 138 are allocated to provide for data redundancy. The mirrored policy region of global memory 138 is used to implement host write IO operations. Global memory "destage pressure" 405, as that term is used herein, is used to refer to a percentage of the slots of the mirrored policy region of global memory that are currently pending destage to back-end storage resources.

In some embodiments, as the global memory destage pressure increases, the weighted bucket table 415 is used to weight slices with larger numbers of front-end tracks that are occupying the larger front-end slot sizes, such that those slices are placed in higher aging buckets. Placing these slices into the higher aging buckets enables the slices to be selected to be destaged with less aging time, thus preferentially making larger numbers of front-end slots of global memory, that have the largest slot size, available for reuse with subsequent host IO write operations.

Figure 5:
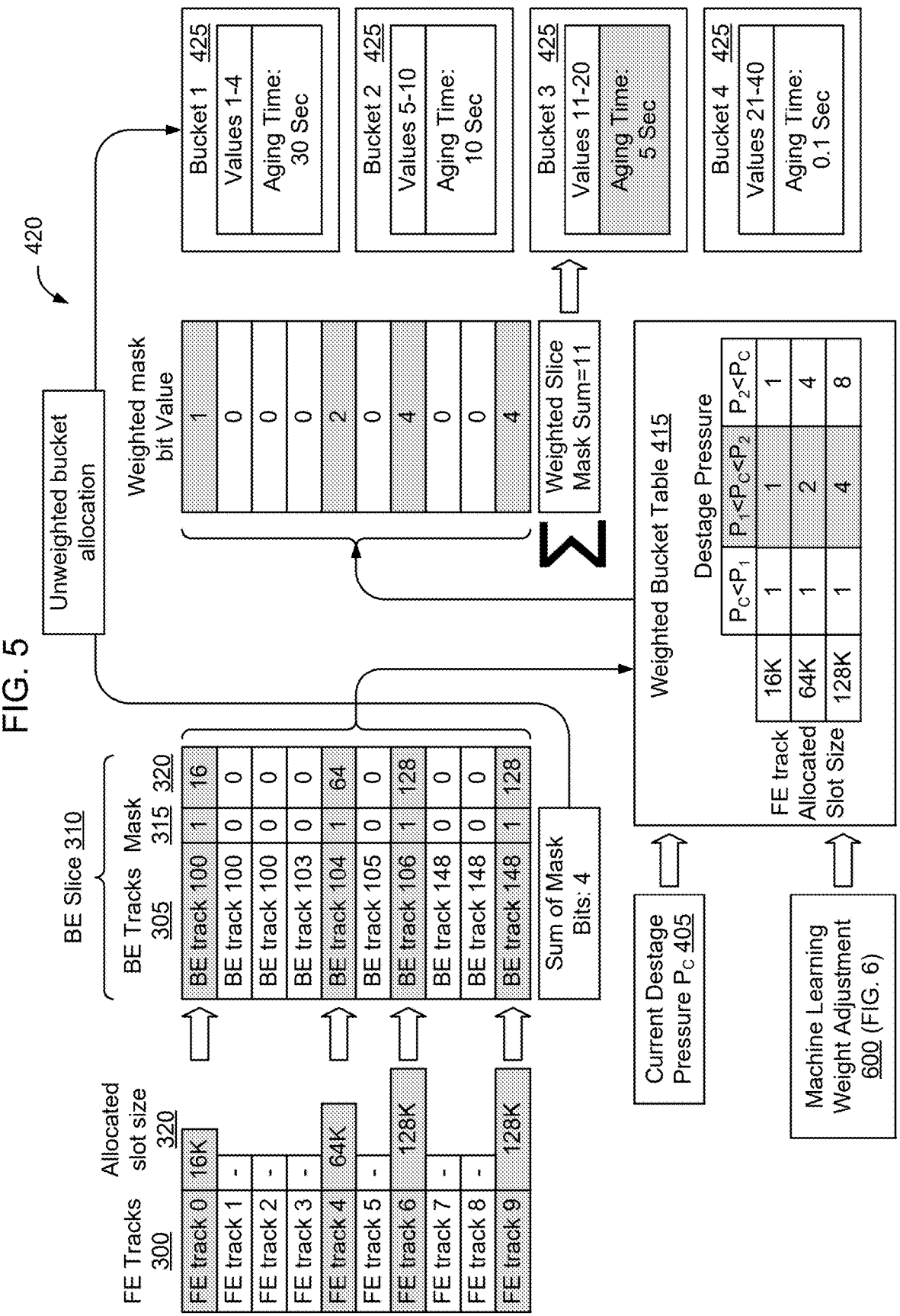
FIG. 5 is a block diagram illustrating an aging bucket selection process of the back-end write destage manager of FIG. 4, according to some embodiments.

FIG. 5 is a block diagram illustrating an aging bucket selection process of the back-end write destage manager of FIG. 4, according to some embodiments. As shown in FIG. 5, in some embodiments, when write IO operations occur on front-end tracks 300, different sized slots of global memory are used to implement the host write IOs. The size 320 of the slot of global memory that is allocated to a given host write IO is identified and included along with the track in the B-tree (see e.g., FIG. 4).

Each time a write IO occurs on a front-end track, the back-end write destage manager 155 determines the back-end slice affected by the write IO and updates a weighted slice mask value. In some embodiments, as shown in FIG. 5, the slice mask includes a bit for each back-end track of the slice. A mask bit is set for the back-end track if at least one front-end track owes data to the back-end track. The back-end write destage manager 155 determines the current destage pressure PC 405 and using the current destage pressure PC 405 determines a weighted mask bit value for each set bit of the slice mask. In some embodiments, the sum of the weighted mask bit values is used to determine a weighted slice mask sum, which is used instead of the sum of mask bits to select an aging bucket.

For example, in FIG. 5 it is assumed that write IO operations have occurred on FE tracks 0, 4, 6, and 9. These FE tracks map to back-end track 100, 104, 106, and 148. Accordingly, corresponding bits for these back-end tracks 305 have been set in the slice mask 315. The sum of the mask bits=4. If an unweighted process was used to select a bucket, the slice would be allocated to bucket number 1. Specifically, as shown in FIG. 5, slices with determined allocation values between 1 and 4 are sent to bucket 1, slices with determined allocation values between 5 and 10 are sent to bucket 2, slices with determined allocation values between 11-20 are sent to bucket 3, and slices with determined allocation values between 21 and 40 are sent to bucket 4. Without weighting, the sum of the bits of the slice mask equal 4, and accordingly without weighting the slice determined allocation value would be 4 and the slice would be allocated to bucket 1.

According to some embodiments, the back-end write destage manager 155 determines the current destage pressure PC 405 and, using the current destage pressure PC 405 and the size of the front-end slot that was used to implement the write IO by the front-end processes, determines a weighted mask bit value for each set bit of the slice mask. In the example shown in FIG. 5, it is assumed that the current destage pressure is above threshold P1 and below threshold P2. Accordingly, the back-end write destage manager determines the size of the front-end slots allocated to each of the write IO operations that are pending destage for the slice, and weights each bit of the mask according to the size of the slot of global memory occupied by the front-end track and the weights of the weighted bucket table 415. In the illustrated example, if a front-end track was allocated a 16K slot, the weight to be applied is the value of 1—no change from normal. If the front-end track was allocated a 64K slot of shared global memory, the weight to be applied to the mask bit is the value of 2. If the front-end track was allocated a 128K slot of shared global memory, the weight to be applied to the mask bit is the value of 4. The weighted mask bit values are shown in FIG. 5. The sum of the weighted mask bit values, in the illustrated example, is 11.

In some embodiments, the back-end write destage manager 155 uses the weighted slice mask sum to select an aging bucket, and the slice is then allocated to the selected aging bucket. In the example shown in FIG. 5, this causes the slice to be placed into bucket 3 rather than bucket 1. Bucket 3 has an aging time of five seconds, whereas bucket 1 has an aging time of 30 seconds. By placing the slice into a higher bucket (bucket 3) it thus is able to preferentially select slices to be destaged that will cause front-end slots with larger slot sizes to be released for subsequent host write IO operations, regardless of the size of the host write IO operation.

In some embodiments, the weighted bucket table 415 contains at least two coefficients for each front-end allocated track size, each of which corresponds to an identified range of destage pressure. In FIG. 5, an example is provided in which there are three different coefficients to be used to weight the front-end track size allocations depending on the current destage pressure Pc 405. It should be understood that different embodiments may include different coefficients and different numbers of destage pressure thresholds. In some embodiments, as shown in FIG. 4, the coefficients are selected to significantly weight front-end tracks that have been allocated the largest slot size when the current destage pressure Pc is quite high, for example in excess of 90%. This causes the back-end slices that have corresponding front-end tracks stored in the largest slots to be preferentially destaged, thus freeing the largest size slots of global memory to be reused for subsequent host write IOs.

In some embodiments, in the B-tree slice element, in addition to the number of back-end tracks and write-pending back-end track mask, the sizes of the write pending slots are also mapped to each back-end track. When calculating the write destage bucket, the number of back-end tracks is weighted/calibrated by slot size and write pending pressure, and the aging bucket is chosen based on the weighted number of tracks for slice.

Figure 6:
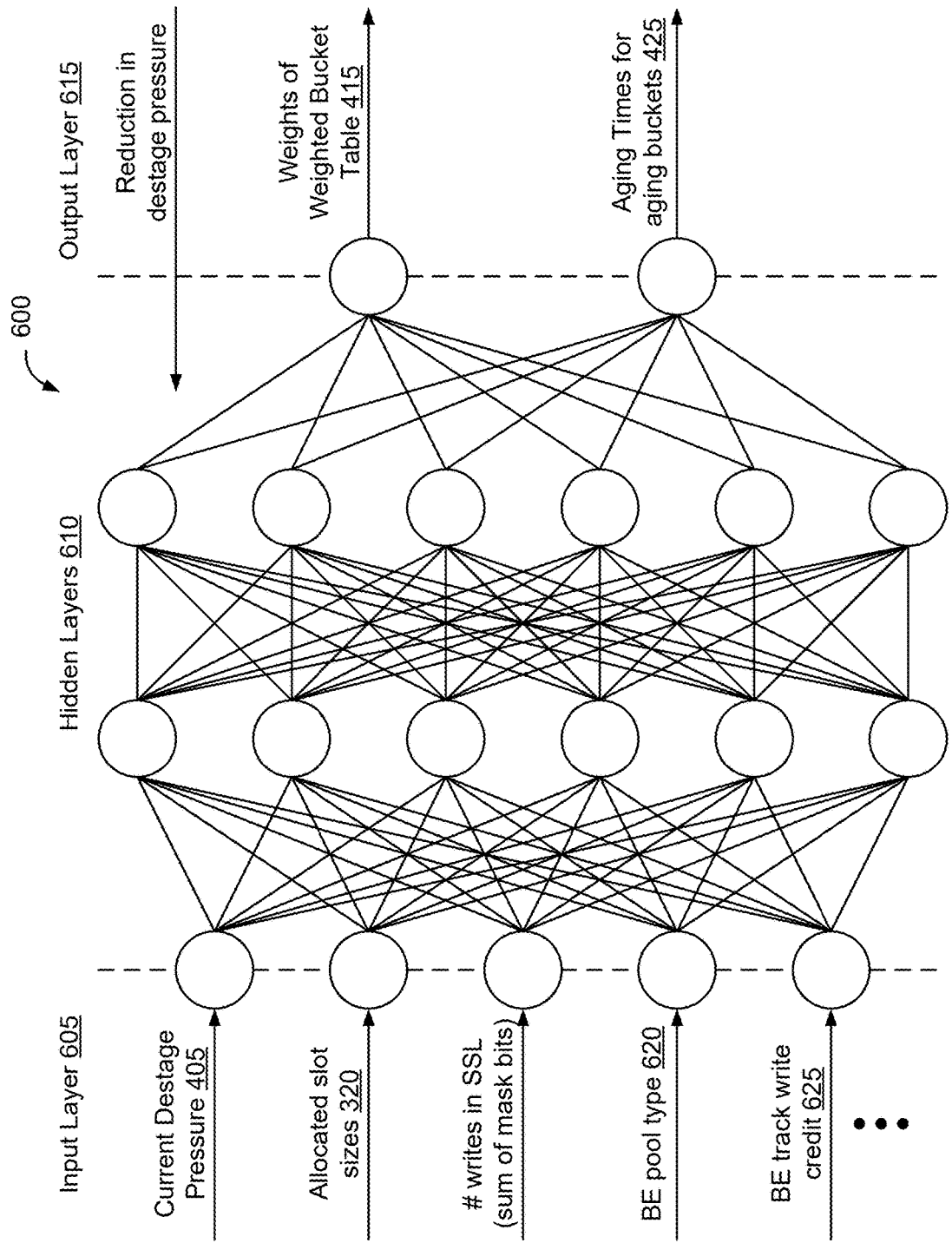
FIG. 6 is a block diagram of an example machine learning process configured to adjust weight values of the weighted bucket table and aging times of the aging buckets of FIG. 5, according to some embodiments.
Figure 7:
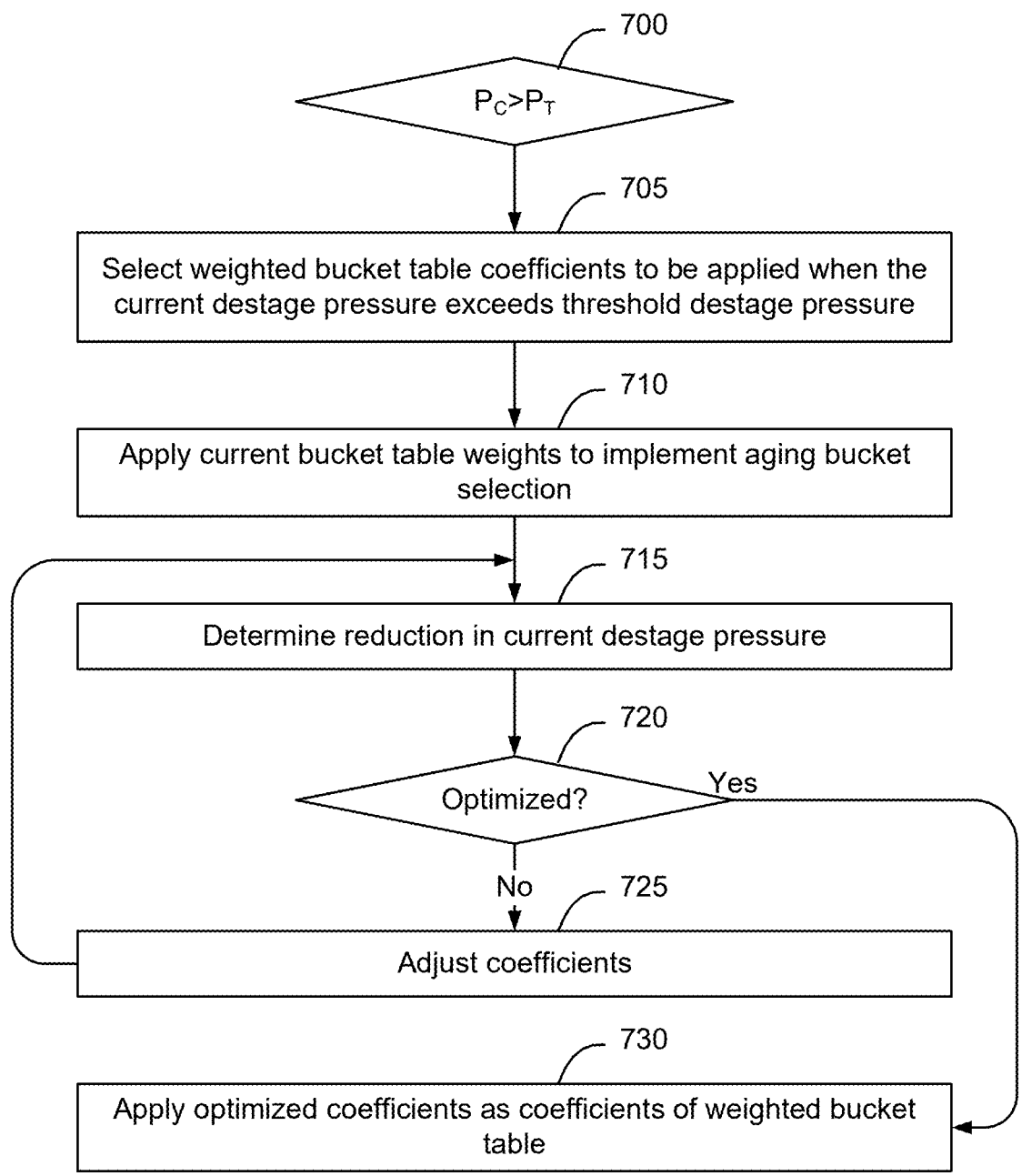
FIG. 7 is a flow chart of an example process of incrementally adjusting weight values of the weighted bucket table of FIG. 5 over time, according to some embodiments.
Figure 9:
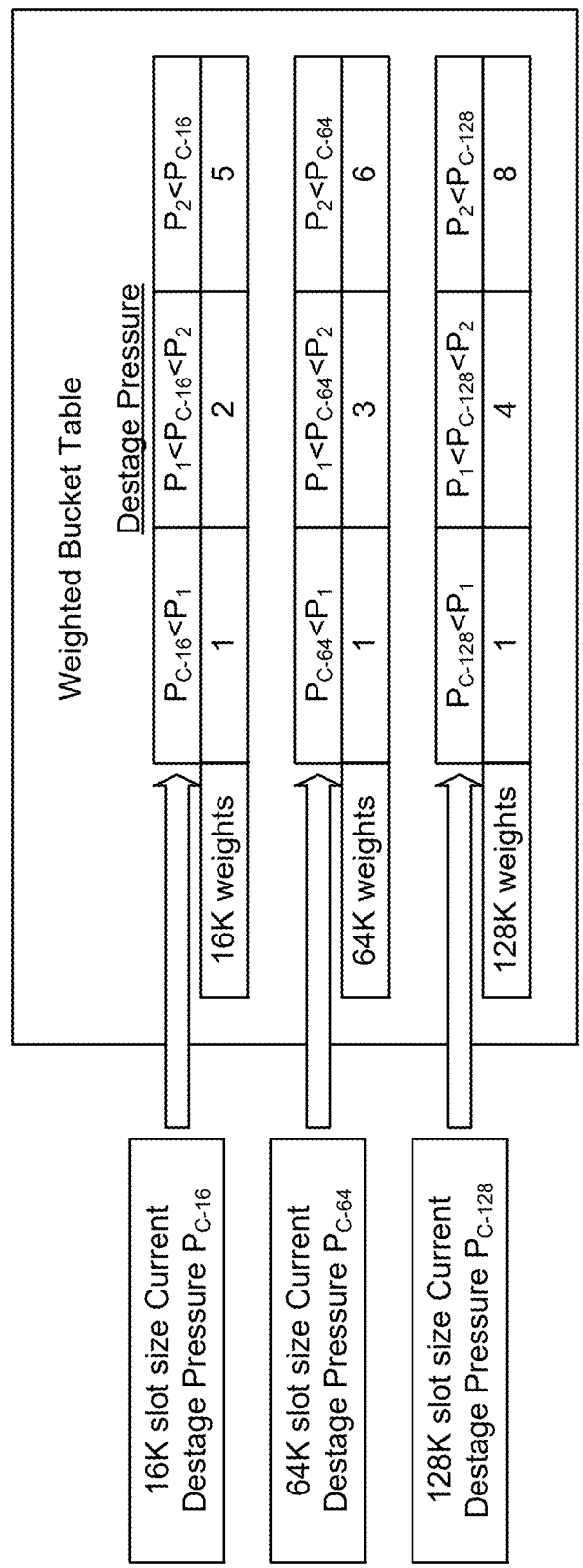
FIG. 9 is a block diagram of another example weighted bucket table for use by a back-end write destage manager configured to prioritize write destage operations to back-end storage resources based on a weighted aging algorithm that incorporates both global memory destage pressure and front-end track slot size allocations, according to some embodiments.

The particular coefficients used to implement weighted bucket table 415 may be adjusted over time, either incrementally using the process shown in FIG. 7, or by a machine learning process. An example machine learning process is shown in FIG. 6. By adjusting the coefficients of the weighted bucket table 415, it is possible to adjust how much preference is provided to selecting particular slices to fine tune the manner in which the back-end write destage manager 155 selects slices to be destaged to best alleviate current destage pressure Pc. FIG. 9, discussed below, contemplates multiple destage pressure values—separate destage pressure values for each slot size—and uses the size specific destage pressure values to key into the weighted bucket table 415. Accordingly, there are many ways of using the weighted bucket table depending on the implementation.

FIG. 6 is a block diagram of an example machine learning process configured to adjust weight values of the weighted bucket table and aging times of the aging buckets of FIG. 5, according to some embodiments. As shown in FIG. 6, in some embodiments the machine learning process 600 is implemented as a multi-layer neural network having an input layer 605, one or more hidden layers 610, and an output layer 615. Depending on the implementation, example inputs at the input layer 605 might include the current destage pressure 405, front-end allocated slot size 320, the number of writes in the slice, which might be implemented for example as the sum of mask bits, and other information about the slices pending destage. In some embodiments, the machine learning process may also receive other input values, such as the back-end pool type 620 which provides information about the speed of back-end storage resources that will be used to implement the slice write destage operation, and the back-end track write credit 625, which refers to the priority provided to the destage operation provided by the back-end processes.

Depending on the implementation, example outputs at the output layer 610 might include the weighting coefficients of the weighted bucket table 415 and the aging times for the aging buckets 425. The destage pressure thresholds P1 and P2 may also be determined as additional outputs of the output layer 610 by the machine learning process 600 depending on the implementation. In some embodiments, the fluctuation in destage pressure is back-propagated through the neural network to enable the nodes of the hidden layers to be adjusted to tune the values of the output nodes to minimize destage pressure over time or to maximize a reduction in destage pressure once the destage pressure increases beyond a selected destage pressure threshold. For example, the machine learning process can be trained to adjust the coefficients used at the hidden nodes 610 to maximize a reduction in destage pressure after the current destage pressure Pc passes a first destage pressure threshold P1 and to maximize a reduction in destage pressure after the current destage pressure Pc passes the second destage pressure threshold P2.

Although FIG. 6 shows some embodiments in which the machine learning process is implemented as a neural network, it should be understood that other forms of machine learning may be used as well, such as using linear regression to determine the weight factors. Accordingly, there are many ways in which the coefficients may be learned and the particular machine learning process used to determine the weighting coefficients of the weighted bucket table 415 may depend on the particular implementation.

FIG. 7 is a flow chart of an example process of incrementally adjusting weight values of the weighted bucket table of FIG. 5 over time, according to some embodiments. As shown in FIG. 7, in some embodiments in response to a determination that the current destage pressure is above a given threshold PT (block 700), an initial set of coefficients is selected (block 705). The initial set of coefficients is a selected set of weighted bucket table coefficients to be applied when the current pressure exceeds threshold destage pressure. The back-end write destage manager 155 applies an initial selected set of coefficients (block 710) for a period of time and determines the reduction in current destage pressure (block 715). A determination is then made if the coefficients are optimized (block 720). In response to a determination that the coefficients are not optimized, or may not be optimized (a determination of NO at block 720), the coefficients are adjusted (block 725). The adjusted coefficients are applied by the back-end write destage manager 155 for a subsequent period of time to determine the effect the adjusted coefficients have on the current back-end write destage pressure (block 715). The process of adjusting the coefficients and determining the effect of the coefficient adjustment on back-end write destage pressure iterates until the coefficients are determined to be optimized (a determination of yes at block 720). The optimized coefficients are then applied as the coefficients of the weighted bucket table by the back-end write destage manager 155 (block 730).

Figure 8:
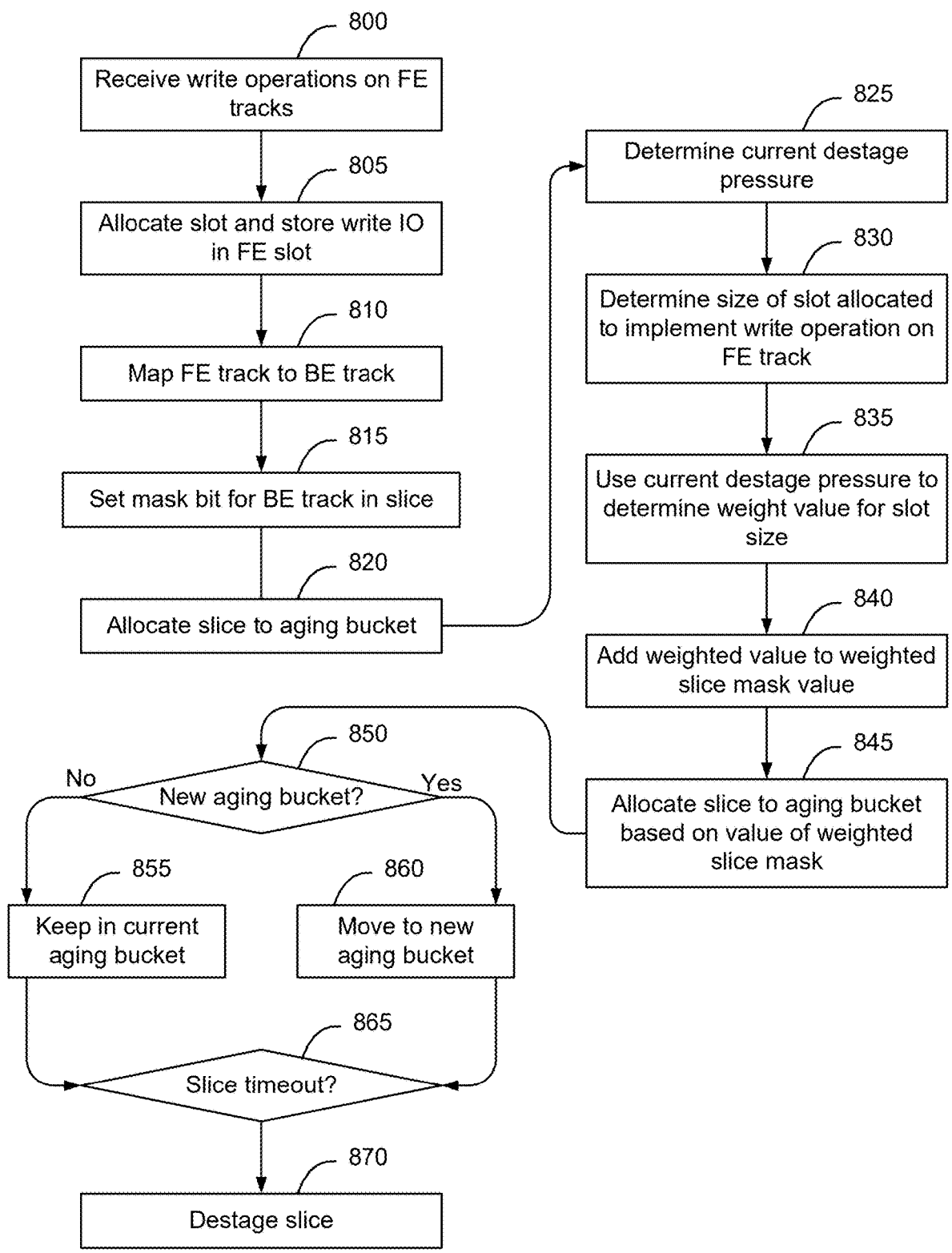
FIG. 8 is a flow chart of an example process of prioritizing write destage operations to back-end storage resources based on a weighted aging algorithm that incorporates both global memory destage pressure and front-end track slot size allocations, according to some embodiments.

FIG. 8 is a flow chart of an example process of prioritizing write destage operations to back-end storage resources based on a weighted aging algorithm that incorporates both global memory destage pressure and front-end track slot size allocations, according to some embodiments. As shown in FIG. 8, write operations are received on front-end tracks of a storage system (block 800). Each write IO operation is implemented by having the front-end allocate a mirrored slot of global memory (referred to herein as "a slot" of global memory) that is used to hold the write IO until the write IO is destaged to back-end storage resources (block 805). Of importance to this disclosure, different sized slots of shared global memory may be allocated to a given write IO, depending on the size of the write IO.

When a write IO is received, the front-end track is mapped to a back-end track (block 810) and the mask bit for the back-end track is set in a mask for a slice that contains the back-end track (block 815). The back-end write destage manager 155 then allocates the slice to an aging bucket 425 (block 820).

In some embodiments, to allocate the slice to an aging bucket, the back-end write destage manager 155 determines the current destage pressure (block 825). The back-end write destage manager 155 also determines the size of the slot of shared global memory that was allocated to implement the write operation on the front-end track (block 830). The current destage pressure and the slot size are used to determine the weighted mask bit value (block 835). The weighted mask bit value is added to the weighted slice mask value (block 840). Where the slice mask has other bits set, this process iterates for each bit of the slice mask to determine a current weighted slice mask value (blocks 825-840).

The slice is then allocated to one of the aging buckets based on the value of the weighted slice mask value (block 845). If the slice is allocated to the same aging bucket as it was previously allocated (a determination of NO at block 850), the slice is kept in the current aging bucket (block 855). If the slice is allocated to a new aging bucket (a determination of YES at block 850), the slice is removed from the previous aging bucket and moved to the new aging bucket (block 860). A determination is then made as to whether the slice has remained in the allocated bucket for the amount of time specified in the aging bucket time. In response to a determination that the slice has timed out of the aging bucket (a determination of YES at block 865), the slice is destaged (block 870).

Although some embodiments have been described in which the current destage pressure is assessed as an overall write destage pressure, in some embodiments differential destage pressures may be measured for each of the front-end slot sizes. For example, FIG. 9 is a block diagram of another example weighted bucket table for use by a back-end write destage manager configured to prioritize write destage operations to back-end storage resources based on a weighted aging algorithm that incorporates both global memory destage pressure and front-end track slot size allocations, according to some embodiments. As shown in FIG. 9, in some embodiments it might be possible to determine the current destage pressure associated with each front-end slot size by looking at the relative percentage of slots in use in each of the slot sizes. This enables the back-end write destage manager 155 to preferentially select slices to be destaged with which-ever slot size is currently in short supply. For example, if 99% of the smallest slot sizes are currently allocated to write IO operations, the current destage pressure Pc-16 would be above threshold P2. Hence, all slices with large numbers of front-end write operations on 16K slots could be prioritized for destage operations, thus reducing the amount of current destage pressure for the smallest slot size. By looking at destage pressure on each of the slot sizes, it is thus possible to further tune the manner in which the back-end write destage manager 155 optimizes selection of slices to be destaged to relieve destage pressure on shared global memory.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of prioritizing back-end slice destage operations based on allocated slot sizes of shared global memory, comprising:
    allocating slots of shared global memory to front-end write IO operations, the allocated slots of shared global memory having slot sizes selected from at least two available slot sizes;
    organizing back-end storage resources in a (Redundant Array of Inexpensive Disks) RAID configuration in which sets of back-end tracks form slices of the RAID configuration;
    maintaining a respective mask for each slice of back-end tracks, the respective mask identifying back-end tracks of the slice that are owed data from the front-end write IO operations that have been allocated slots of the shared global memory;
    weighting the mask bits of the respective masks according to a combination of the slot size of shared global memory associated with the corresponding front-end write IO operation that is pending destage to the back-end track and a current destage pressure on shared global memory;
    using a sum of the weighted mask bits to determine a respective aging time for the slice; and
    upon expiration of the respective aging time for the slice, selecting the respective slice to be destaged to back-end storage resources.

2. The method of claim 1, wherein using the sum of the weighted mask bits to determine a respective aging time for the slice comprises selecting an aging bucket for the slice from a plurality of aging buckets, each aging bucket having a respective unique aging time.

3. The method of claim 2, wherein each aging bucket is configured to contain slices having ranges of values of sums of weighted mask bits, and wherein one of the aging buckets associated with a range of higher values of sums of weighted mask bits has a shorting aging time than one of the aging buckets associated with a range of lower values of sums of weighted mask bits.

4. The method of claim 1, wherein weighting the mask bits of the respective masks according to the combination of the slot size of shared global memory associated with the corresponding front-end write IO operation that is pending destage to the back-end track and the current destage pressure on shared global memory comprises:
    determining the current destage pressure and, for each respective set mask bit;
    determining the slot size of the slot of global memory that was allocated to the front-end write IO operation that has data that is owed to the back-end track associated with the respective set mask bit; and
    selecting a weight value to be added to the sum of weighted mask bits for the respective set mask bit from a plurality of weight values contained in a weighted bucket table.

5. The method of claim 4, wherein the weighted bucket table contains different weight values for each of a plurality of ranges of current destage pressures.

6. The method of claim 5, wherein the weighted bucket table contains larger weight values for front-end write IO operations that were allocated larger slot sizes of shared global memory.

7. The method of claim 4, wherein the current destage pressure is calculated as a percentage of the slots of a mirrored policy region of shared global memory that are currently pending destage to back-end storage resources.

8. The method of claim 7, further comprising adjusting the weight values of the weighted bucket table over time.

9. The method of claim 8, wherein adjusting the weight values of the weighted bucket table over time comprises training a neural network learning process to learn the weight values to optimize a reduction in destage pressure given as input a current destage pressure, mask values for slices of back-end tracks, and respective slot sizes of front-end tracks.

10. The method of claim 1, further comprising recalculating the sum of weighted mask bits in response to a determination that the current destage pressure has increased beyond a destage pressure threshold.

11. A system for prioritizing back-end slice destage operations based on allocated slot sizes of shared global memory, comprising:
    one or more processors and one or more storage devices storing instructions that are configured, when executed by the one or more processors, to cause the one or more processors to perform operations comprising:
    allocating slots of shared global memory to front-end write IO operations, the allocated slots of shared global memory having slot sizes selected from at least two available slot sizes;
    organizing back-end storage resources in a (Redundant Array of Inexpensive Disks) RAID configuration in which sets of back-end tracks form slices of the RAID configuration;
    maintaining a respective mask for each slice of back-end tracks, the respective mask identifying back-end tracks of the slice that are owed data from the front-end write IO operations that have been allocated slots of the shared global memory;

weighting the mask bits of the respective masks according to a combination of the slot size of shared global memory associated with the corresponding front-end write IO operation that is pending destage to the back-end track and a current destage pressure on shared global memory;
using a sum of the weighted mask bits to determine a respective aging time for the slice; and
upon expiration of the respective aging time for the slice, selecting the respective slice to be destaged to back-end storage resources.

12. The system of claim 11, wherein using the sum of the weighted mask bits to determine a respective aging time for the slice comprises selecting an aging bucket for the slice from a plurality of aging buckets, each aging bucket having a respective unique aging time.

13. The system of claim 12, wherein each aging bucket is configured to contain slices having ranges of values of sums of weighted mask bits, and wherein one of the aging buckets associated with a range of higher values of sums of weighted mask bits has a shorting aging time than one of the aging buckets associated with a range of lower values of sums of weighted mask bits.

14. The system of claim 11, wherein weighting the mask bits of the respective masks according to the combination of the slot size of shared global memory associated with the corresponding front-end write IO operation that is pending destage to the back-end track and the current destage pressure on shared global memory comprises:
determining the current destage pressure and, for each respective set mask bit;
determining the slot size of the slot of global memory that was allocated to the front-end write IO operation that has data that is owed to the back-end track associated with the respective set mask bit; and
selecting a weight value to be added to the sum of weighted mask bits for the respective set mask bit from a plurality of weight values contained in a weighted bucket table.

15. The system of claim 14, wherein the weighted bucket table contains different weight values for each of a plurality of ranges of current destage pressures.

16. The system of claim 15, wherein the weighted bucket table contains larger weight values for front-end write IO operations that were allocated larger slot sizes of shared global memory.

17. The system of claim 14, wherein the current destage pressure is calculated as a percentage of the slots of a mirrored policy region of shared global memory that are currently pending destage to back-end storage resources.

18. The system of claim 17, further comprising adjusting the weight values of the weighted bucket table over time.

19. The system of claim 18, wherein adjusting the weight values of the weighted bucket table over time comprises training a neural network learning process to learn the weight values to optimize a reduction in destage pressure given as input a current destage pressure, mask values for slices of back-end tracks, and respective slot sizes of front-end tracks.

20. The system of claim 11, further comprising recalculating the sum of weighted mask bits in response to a determination that the current destage pressure has increased beyond a destage pressure threshold.

* * * * *